US009494786B2

(12) United States Patent
Kimoto et al.

(10) Patent No.: US 9,494,786 B2
(45) Date of Patent: Nov. 15, 2016

(54) INFORMATION PROCESSING APPARATUS, INFORMATION PROCESSING METHOD, PROGRAM, AND INFORMATION PROCESSING SYSTEM

(75) Inventors: Masashi Kimoto, Tokyo (JP); Shigeatsu Yoshioka, Kanagawa (JP); Yutaka Hasegawa, Kanagawa (JP); Masao Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 320 days.

(21) Appl. No.: 13/085,638

(22) Filed: Apr. 13, 2011

(65) Prior Publication Data

US 2011/0254764 A1    Oct. 20, 2011

(30) Foreign Application Priority Data

Apr. 16, 2010 (JP) ................. P2010-095530

(51) Int. Cl.
 G09G 5/08 (2006.01)
 G02B 21/36 (2006.01)

(52) U.S. Cl.
 CPC .................... *G02B 21/367* (2013.01)

(58) Field of Classification Search
 CPC ................................... G02B 21/367
 USPC ................ 463/45, 39–42; 709/204; 345/157
 See application file for complete search history.

(56) References Cited

U.S. PATENT DOCUMENTS

| 5,263,869 A * | 11/1993 | Ziv-El ............... 709/204 |
| 6,272,235 B1 | 8/2001 | Bacus et al. |
| 7,352,288 B2 * | 4/2008 | Miyake ............ 340/12.3 |
| 8,555,322 B2 * | 10/2013 | Salomons et al. ......... 725/78 |

(Continued)

FOREIGN PATENT DOCUMENTS

| JP | 06-243082 | 9/1994 |
| JP | 07-129364 | 5/1995 |
| JP | 08-022370 | 1/1996 |
| JP | 08-185298 | 7/1996 |
| JP | 10-040065 | 2/1998 |
| JP | 2000-181846 | 6/2000 |
| JP | 2001-014253 | 1/2001 |
| JP | 2009-37250 | 2/2009 |

OTHER PUBLICATIONS

Japanese Patent Office, Grounds for refusal notice issued in connection with Japanese Patent Application Serial No. 2010-095530, dated Aug. 27, 2013. (6 pages).

(Continued)

*Primary Examiner* — Quan-Zhen Wang
*Assistant Examiner* — Tony Davis
(74) *Attorney, Agent, or Firm* — K&L Gates LLP

(57) ABSTRACT

An information processing apparatus includes a connection unit, a processing execution unit, a setting unit, and a controller. The connection unit is capable of connecting input apparatuses that output operation information for executing an operation for an image displayed on a screen. The processing execution unit is capable of executing processing corresponding to the operation information on the image. The setting unit sets one of the input apparatuses as a main input apparatus, and sets the other input apparatuses as secondary input apparatuses. The controller performs control such that execution of the processing for the image by the processing execution unit based on the operation information from the input apparatus set as the main input apparatus is validated, and execution of the processing for the image by the processing execution unit based on the operation information from the input apparatuses set as the secondary input apparatuses is invalidated.

12 Claims, 19 Drawing Sheets

(56) References Cited

U.S. PATENT DOCUMENTS

| | | | |
|---|---|---|---|
| 2003/0040364 A1* | 2/2003 | Yabe et al. | 463/43 |
| 2003/0124979 A1* | 7/2003 | Tanada et al. | 455/41 |
| 2005/0026695 A1* | 2/2005 | Tsuchiyama et al. | 463/42 |
| 2005/0159221 A1* | 7/2005 | Kamikawa et al. | 463/42 |
| 2006/0068917 A1* | 3/2006 | Snoddy et al. | 463/42 |
| 2008/0076498 A1* | 3/2008 | Yoshinobu et al. | 463/9 |
| 2008/0281597 A1* | 11/2008 | Suzuki | 704/258 |
| 2009/0143140 A1* | 6/2009 | Kitahara | 463/37 |
| 2009/0210809 A1* | 8/2009 | Bacus et al. | 715/764 |

OTHER PUBLICATIONS

Takeda et al., "Preliminary Experiments with A Distributed and Networking Card-handling Tool Named KJ-Editor." (11 pages).

* cited by examiner

| Setting table | | | | |
|---|---|---|---|---|
| ID | 1 | 2 | 3 | 4 |
| Operation right flag | 1 | 0 | 0 | 0 |

FIG.5

| Setting table | | | | |
|---|---|---|---|---|
| ID | 1 | 2 | 3 | 4 |
| Operation right flag | 1 | 0 | 0 | 0 |
| color | Green | Blue | Red | Yellow |
| Position information (coordinates) | (x1,y1) | (x2,y2) | (x3,y3) | (x4,y4) |
| Magnification | 1.25 | 1.25 | 20 | 40 |
| Time | 02h30m00s | 02h10m20s | 01h50m10s | 01h35m00s |

FIG.18 ns of US 9,494,786 B2

INFORMATION PROCESSING APPARATUS, INFORMATION PROCESSING METHOD, PROGRAM, AND INFORMATION PROCESSING SYSTEM

CROSS REFERENCES TO RELATED APPLICATIONS

The present application claims priority to Japanese Priority Patent Application JP 2010-095530 filed in the Japan Patent Office on Apr. 16, 2010, the entire content of which is hereby incorporated by reference.

BACKGROUND

The present application relates to an information processing apparatus, an information processing method, a program, and an information processing system that control display of an image obtained by a microscope in a field of medicine, pathology, biology, materials science, or the like.

In a field of medicine, pathology, or the like, there has been proposed a system that digitizes an image of a cell, a tissue, an organ, or the like of a living body, which is obtained by an optical microscope, to examine the tissue or the like or diagnose a patient by a doctor or a pathologist based on the digitized image.

For example, Japanese Patent Application Laid-open No. 2009-37250 (hereinafter, referred to as Patent Document 1) discloses a method in which an image optically obtained by a microscope is digitized by a video camera with a CCD (Charge Coupled Device), a digital signal is input to a control computer system, and the image is visualized on a monitor. A pathologist performs examination or the like while watching the image displayed on the monitor (see, for example, paragraphs [0027] and [0028] and FIG. 5 of Patent Document 1).

The above-mentioned image of an observation target that is used for examination or the like of the pathologist (hereinafter, referred to as pathological image) has the size of about 40×30 (Kpixels) in many cases. A part of the image having such a huge size is selected and displayed on a monitor screen having the size of about 1,920×1,080 (pixels). Using an input device such as a mouse, the pathologist observes the entire pathological image while moving, enlarging, or contracting a display area displayed on the monitor screen.

SUMMARY

Incidentally, there are many cases in which a plurality of pathologists share one monitor screen and diagnose or verify one pathological image while discussing the pathological image. Input devices are prepared for the plurality of pathologists, with which the movement, enlargement, or contraction of an area displayed on the monitor screen is performed by each pathologist. In the case where the diagnosis of such a form called conference is performed, there may be a case where it may be difficult to recognize which part of the huge pathological image the area displayed on the shared monitor screen is, when each pathologist moves the displayed area according to one's discretion. In such a case, the efficiency or accuracy of a diagnosis or the like by the plurality of pathologists is lowered, which leads to a possibility of an erroneous diagnosis or the like.

In view of the circumstances as described above, it is desirable to provide an information processing apparatus, an information processing method, a program, and an information processing system that enables a plurality of users to efficiently observe an observation target.

According to an embodiment, there is provided an information processing apparatus including a connection unit, a processing execution unit, a setting unit, and a controller.

The connection unit is capable of connecting a plurality of input apparatuses that output operation information for executing an operation for an image displayed on a screen.

The processing execution unit is capable of executing processing corresponding to the operation information on the image displayed on the screen.

The setting unit sets one of the plurality of input apparatuses connected by the connection unit, as a main input apparatus, and sets the other input apparatuses as secondary input apparatuses.

The controller performs control such that execution of the processing for the image by the processing execution unit based on the operation information from the input apparatus set as the main input apparatus is validated, and execution of the processing for the image by the processing execution unit based on the operation information from the input apparatuses set as the secondary input apparatuses is invalidated.

In the information processing apparatus, one of the plurality of input apparatuses to be connected is set as a main input apparatus, and the other input apparatuses are set as secondary input apparatuses. Then, the execution of the processing for the image based on the operation information from the main input apparatus is validated, and the execution of the processing for the image based on the operation information from the secondary input apparatuses is invalidated. Therefore, it is possible to prevent a plurality of users from having difficulty in grasping an image displayed on the screen when the plurality of users simultaneously operate the image. Accordingly, the plurality of users can observe an observation target efficiently.

The information processing apparatus may further include a pointer display means for displaying a plurality of pointers that indicate positions designated by the plurality of input apparatuses on the screen such that correspondences between the plurality of pointers and the plurality of input apparatuses can be distinguished from one another. Accordingly, a user using the secondary input apparatus can indicate a predetermined position of the image while moving the pointer on the screen.

Based on a setting change request that is input from one of the input apparatuses set as the secondary input apparatuses, the setting unit may change a setting such that the input apparatus is set as the main input apparatus. Accordingly, the settings of the main input apparatus and secondary input apparatuses in the plurality of input apparatuses are changed as appropriate, with the result that the plurality of users can observe an observation target efficiently.

The operation for the image may be an operation of changing a display position of image data on the screen, the image data having a larger resolution as that of the screen.

In this case, the information processing apparatus may further include a storage configured to store information of the display position of the image data.

Further, when a setting of one of the plurality of input apparatuses is changed from the main input apparatus to the secondary input apparatus by the setting unit, the controller may store, in the storage, the information of the display position of the image data that has been displayed on the screen before a setting change, and when the input apparatus is then set as the main input apparatus, the controller may restore display of the image data before the setting change based on the information of the display position of the image data stored in the storage.

In the information processing apparatus, when an input apparatus whose setting has been previously changed from the main input apparatus to the secondary input apparatus is set again as the main input apparatus, the image operated by the input apparatus as the main input apparatus previously can be displayed on the screen. Accordingly, the plurality of users can observe an observation target efficiently.

According to another embodiment, there is provided an information processing method including setting, by a setting unit, as a main input apparatus, one of a plurality of input apparatuses connected to a connection unit to output operation information for executing an operation for an image displayed on a screen, and setting the other input apparatuses as secondary input apparatuses.

By a controller, execution of processing for the image based on the operation information from the input apparatus set as the main input apparatus is exclusively validated.

By a processing execution unit, the processing for the image based on the operation information is executed.

According to another embodiment, there is provided a program causing a computer to operate as a connection unit, a processing execution unit, a setting unit, and a controller.

The connection unit is capable of connecting a plurality of input apparatuses that output operation information for executing an operation for an image displayed on a screen.

The processing execution unit is capable of executing processing corresponding to the operation information on the image displayed on the screen.

The setting unit sets one of the plurality of input apparatuses connected by the connection unit, as a main input apparatus, and sets the other input apparatuses as secondary input apparatuses.

The controller performs control such that execution of the processing for the image by the processing execution unit based on the operation information from the input apparatus set as the main input apparatus is exclusively validated.

The program may be recorded on a recording medium.

According to another embodiment, there is provided an information processing system including a plurality of input apparatuses, a setting unit, a display, a processing execution unit, and a controller.

The plurality of input apparatuses output operation information for executing an operation for an image displayed on a screen.

The setting unit sets one of the plurality of input apparatuses as a main input apparatus, and sets the other input apparatuses as secondary input apparatuses.

The display displays, as the screen, a shared screen and an individual screen of each input apparatus.

The shared screen displays an image as an operation target for a user using the input apparatus set as the main input apparatus and a plurality of pointers indicating positions designated by the plurality of input apparatuses.

The individual screen displays an image as an operation target for a user using one of the input apparatuses set as the secondary input apparatuses and a pointer designated by the input apparatus.

The processing execution unit is capable of executing processing corresponding to the operation information on each of the images displayed on the shared screen and the individual screen.

The controller performs control such that execution of the processing for the image displayed on the shared screen by the processing execution unit based on the operation information from the input apparatus set as the main input apparatus is exclusively validated.

In the information processing system, the individual screen for each input apparatus is displayed by the display. For the image displayed on the individual screen, the execution of the processing corresponding to the operation information is effective irrespective of whether an input apparatus used by each user is set as the main input apparatus or the secondary input apparatus. Accordingly, the user can also observe well the image displayed on the individual screen for a period of time during which an input apparatus to be used is set as the secondary input apparatus.

Based on a setting change request that is input from one of the input apparatuses set as the secondary input apparatuses, the setting unit may change a setting such that the input apparatus is set as the main input apparatus.

When a setting of the input apparatus is changed from the secondary input apparatus to the main input apparatus by the setting unit based on the setting change request from the input apparatus, the controller may display the image that has been displayed on the individual screen before a setting change, as an image of the shared screen.

In the information processing system, when the input apparatus set as the secondary input apparatus is set as the main input apparatus, the image that has been displayed on the individual screen corresponding to the input apparatus is displayed on the shared screen. Accordingly, a user using the input apparatus set as the main input apparatus can state his/her opinion while operating, on the shared screen, the image that has been displayed on the individual screen.

According to the embodiments of the present application, the plurality of users can observe an observation target efficiently.

Additional features and advantages are described herein, and will be apparent from the following Detailed Description and the figures.

BRIEF DESCRIPTION OF THE FIGURES

FIG. 5 is a diagram showing a look-up table (setting table) indicating setting statuses of an operation controller and a position controller;

FIG. 18 is a diagram showing a setting table used for the processing by the PC described with reference to FIGS. 16 and 17;

DETAILED DESCRIPTION

Embodiments of the present application will be described below in detail with reference to the drawings.

First Embodiment

Figure 1:
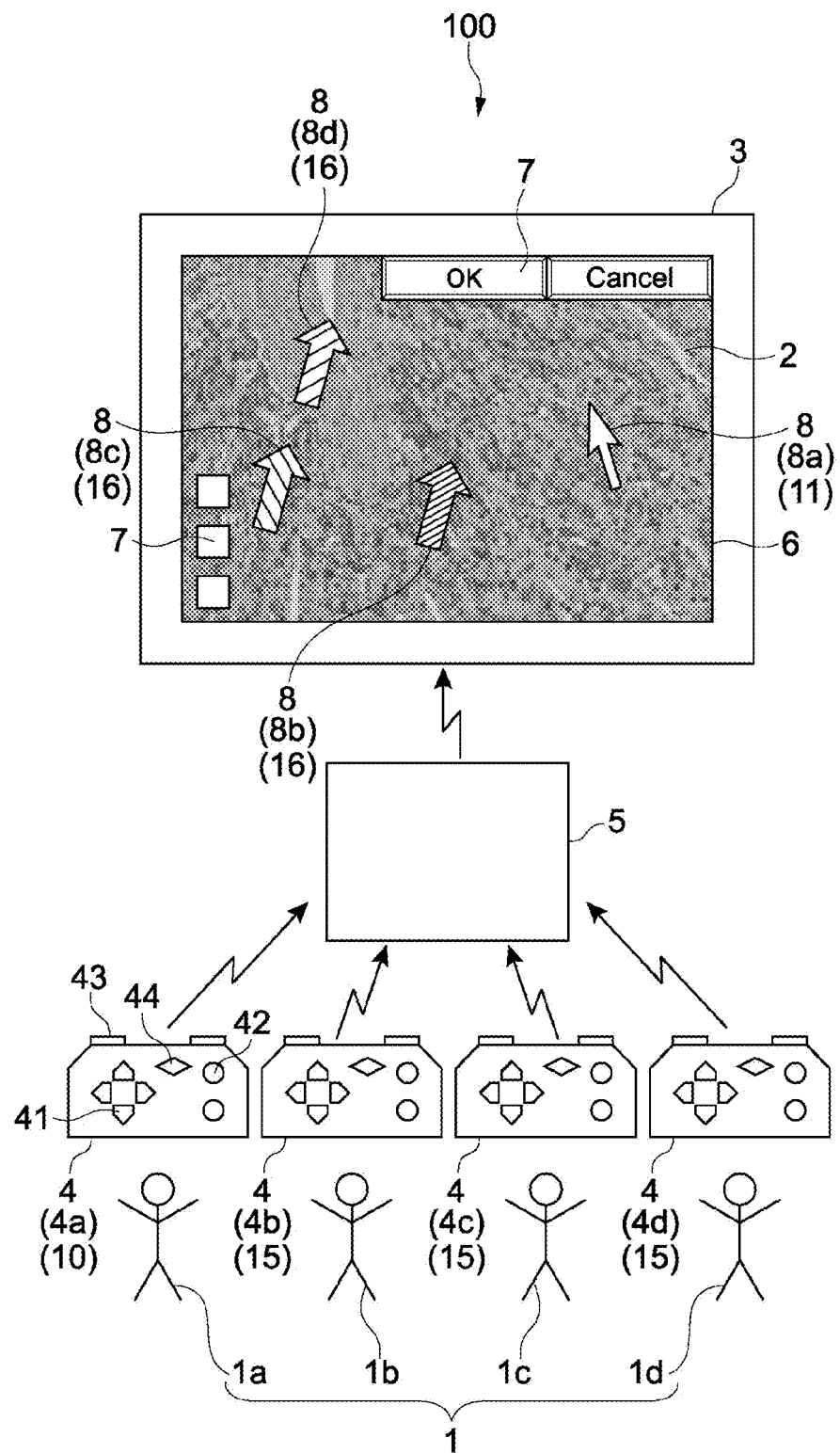
FIG. 1 is a schematic diagram showing a structure of an information processing system according to a first embodiment.

FIG. 1 is a schematic diagram showing a structure of an information processing system according to a first embodiment.

An information processing system 100 includes a display apparatus 3 for displaying an image 2 shared for viewing by a plurality of users 1, controllers 4 serving as input apparatuses used by the respective users 1, and an information processing apparatus connected to the display apparatus 3 and the controllers 4 in a wireless or wired manner.

Structure of Information Processing Apparatus

Figure 2:
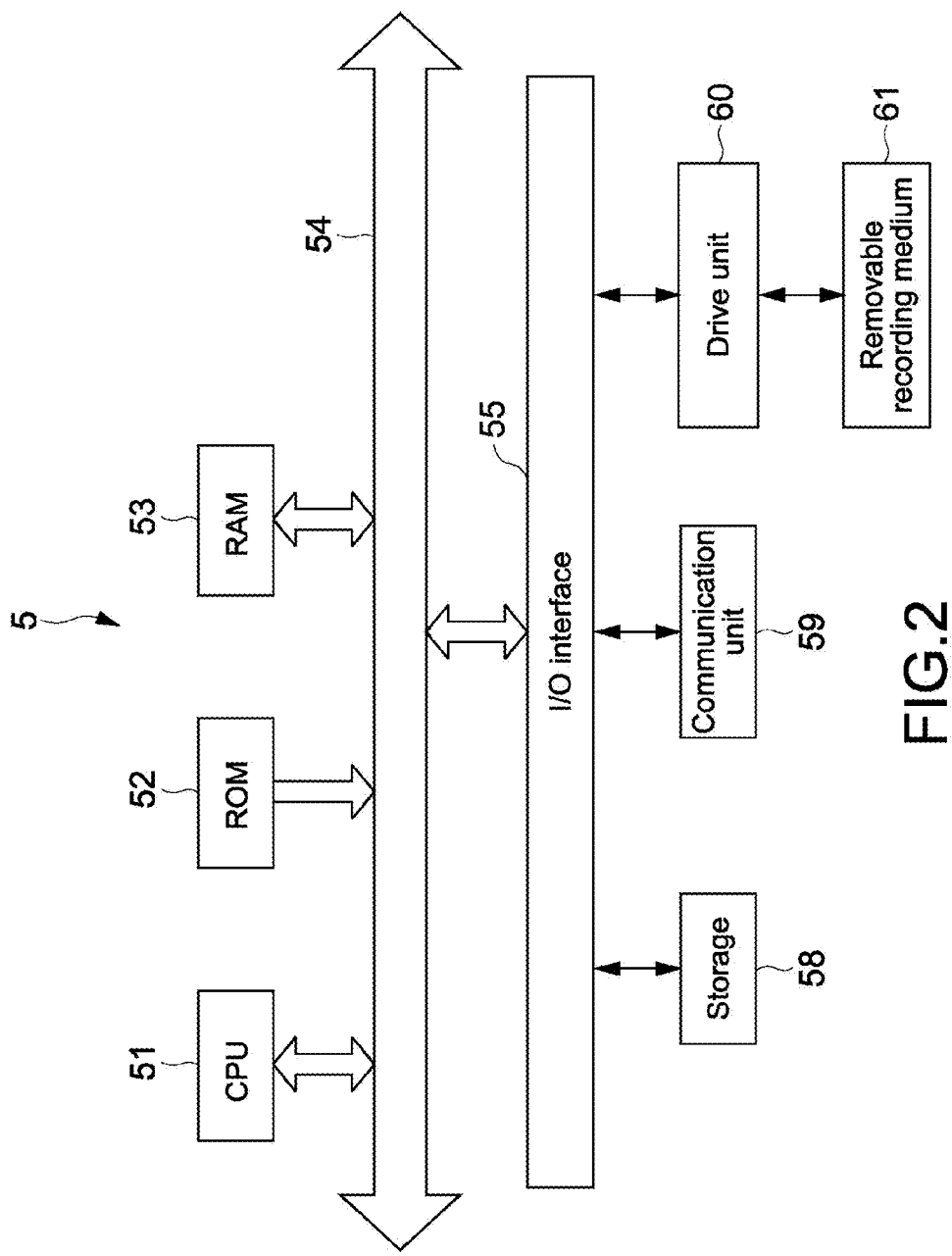
FIG. 2 is a block diagram showing a structure of a PC (Personal Computer) as the information processing apparatus according to the first embodiment.

FIG. 2 is a block diagram showing a structure of a PC (Personal Computer) 5 as an information processing apparatus according to this embodiment. As the information processing apparatus, audio/visual equipment, a projector, or the like may be used instead of the PC 5.

The PC 5 includes a CPU (Central Processing Unit) 51, a ROM (Read Only Memory) 52, a RAM (Random Access Memory) 53, an input and output interface (hereinafter, abbreviated as I/O interface) 55, and a bus 54 that connects those components with one another.

To the I/O interface 55, the display apparatus 3 and the controllers 4 described above are connected. Further, a storage 58, a communication unit 59, a drive unit 60, and the like are connected to the I/O interface 55.

The storage 58 is a non-volatile storage device such as an HDD (Hard Disk Drive), a flash memory, and another solid-state memory.

The drive unit 60 is a device capable of driving a removable recording medium 61 such as an optical recording medium, a floppy (registered trademark) disk, a magnetic recording tape, and a flash memory. In contrast, the storage 58 is often used as a device that is previously included in the PC 5 and mainly drives a recording medium that is not removable.

The communication unit 59 is a modem, a router, or another communication device that is connectable to a LAN (Local Area Network), a WAN (Wide Area Network), or the like and is used for communicating with another device. The communication unit 59 may perform one of a wired communication or a wireless communication. The communication unit 59 is used separately from the PC 5 in many cases.

The display apparatus 3 has a screen 6 for which liquid crystal, EL (Electro-Luminescence), a CRT (Cathode Ray Tube), or the like is used, for example. In this embodiment, an image of a observation target that is captured by an optical microscope is displayed on the screen 6. The image 2 is stored in the storage 58 of the PC 5, and displayed based on the display principle described as follows.

Figure 3:
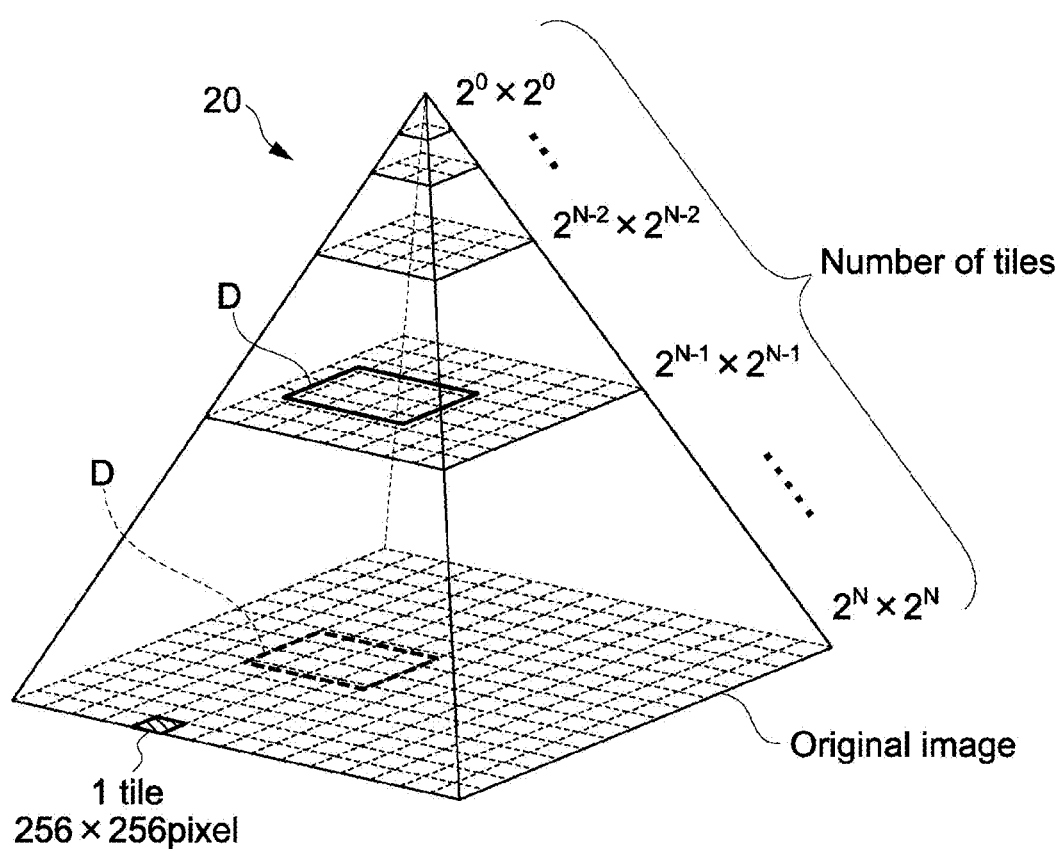
FIG. 3 is a diagram showing an image pyramid structure for explaining the display principle of a shared image by the PC shown in FIG. 2.

FIG. 3 is a diagram showing an image pyramid structure for explaining the display principle of the image 2 by the PC 5.

An image pyramid structure 20 in this embodiment is an image group (whole image group) generated for the same image obtained by capturing an image of a single observation target 25 (see FIG. 4) by an optical microscope at different resolutions. In the lowermost layer of the image pyramid structure 20, an image having the largest size is arranged, and in the uppermost layer thereof, an image having the smallest size is arranged. The resolution of the image having the largest size is, for example, 40×30 (Kpixels) or 50×50 (Kpixels). The resolution of the image having the smallest size is, for example, 256×256 (pixels) or 256×512 (pixels).

Specifically, when those images are displayed on the same screen 6 at 100%, for example (displayed at the number of dots, which is physically the same as the number of pixels of each image), the image having the largest size is displayed largest and the image having the smallest size is displayed smallest. Here, in FIG. 3, a display range of each image to be displayed on the screen 6 is denoted by D. In this embodiment, the size of the display range corresponds to the number of dots of the screen 6, and is 1,920×1,080 (pixels), for example.

Figure 4:
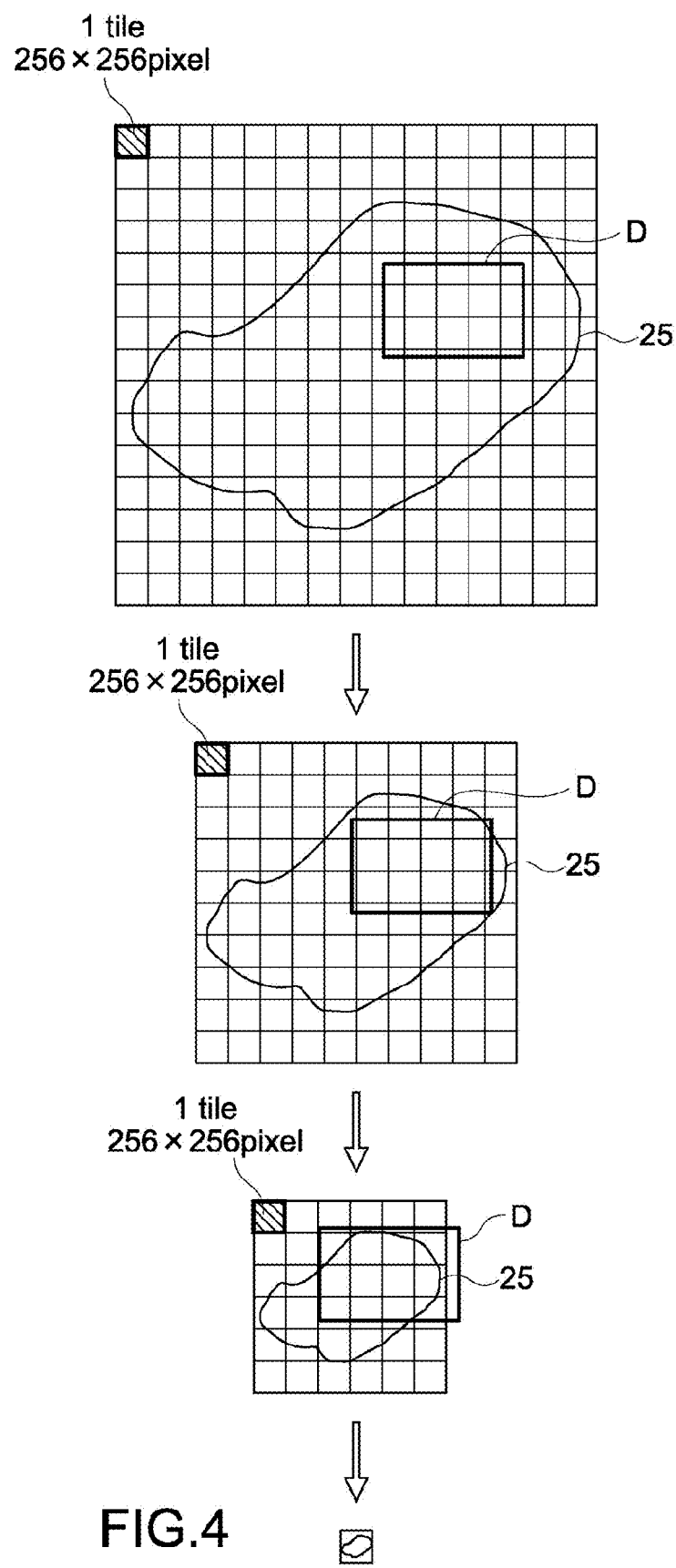
FIG. 4 is a diagram for explaining a procedure when an image group of the image pyramid structure shown in FIG. 3 is generated.

FIG. 4 is a diagram for explaining a procedure when an image group of the image pyramid structure 20 is generated.

First, a digital image of the original image obtained by an optical microscope (not shown) at a predetermined observation magnification is prepared. This original image corresponds to the image having the largest size, which is the lowermost image of the image pyramid structure 20 shown in FIG. 3. In other words, the original image is an image having the highest resolution. Therefore, as the lowermost image of the image pyramid structure 20, an image that is observed at a relatively high magnification and then obtained by the optical microscope is used.

It should be noted that in the field of pathology, generally, a matter obtained by slicing an organ, a tissue, or a cell of a living body, or a part thereof is an observation target 25. Then, a scanner apparatus (not shown) having a function of an optical microscope reads out the observation target 25 set on a glass slide, to thereby store a digital image thus obtained in the scanner apparatus or another storage apparatus.

As shown in FIG. 4, the scanner apparatus or a general-purpose computer (not shown) generates a plurality of images having resolutions reduced stepwise, from the image having the largest size obtained as described above. Then, the scanner apparatus or the general-purpose computer stores those images in units of "tiles" of a predetermined size, for example. The size of one tile is, for example, 256×256 (pixels). The image group thus generated forms the image pyramid structure 20, and the image pyramid structure 20 is stored in the storage 58 of the PC 5. In reality, the PC 5 may only have to store those images having different resolutions and resolution information items in association with each other. It should be noted that the PC 5 shown in FIG. 2 may generate and store the image pyramid structure 20.

The whole image group forming the image pyramid structure 20 may be generated by a known compression method, or generated by a known compression method used when a thumbnail image is generated, for example.

The PC 5 uses software that adopts a system of the image pyramid structure 20, to extract a desired image from the image pyramid structure 20 in accordance with an input operation made via the controller 4 used by a user and to output the image to the shared screen 6. Specifically, the PC 5 displays an image of any part selected by the user from an image having any resolution selected by the user. By such processing, the user can obtain a feeling of observing an observation target 25 while changing an observation magnification. In other words, the PC 5 functions as a virtual microscope. The virtual observation magnification used here corresponds to the resolution in actuality.

Further, as shown in FIG. 1, GUIs (Graphical User Interfaces) such as an icon 7 and a pointer 8 are displayed on the screen 6. The icon refers to an image, displayed on the screen 6, indicating a function of a program to be executed by the CPU 51, an execution command, details of a file, or the like. The pointer 8 (so-called cursor) is an object indicating a position on the screen 6, which is designated by the user with an input apparatus.

In this embodiment, resources of an image processing system and an image display system by one PC 5 are shared by a plurality of users, and accordingly the plurality of controllers 4 are connected to the PC 5. At the positions on the screen 6 that are designated by the respective controllers 4, a plurality of pointers 8 corresponding to the respective controllers 4 are displayed at the same time. In other words, this situation provides an environment where the plurality of users can state their opinions while designating predetermined parts on one image by the pointers 8.

In the example of FIG. 1, four pointers 8*a* to 8*d* corresponding to four controllers 4*a* to 4*d*, respectively, are displayed on the screen 6. The pointers 8 may be displayed so as to be distinguished from each other with colors such as red, blue, yellow, and green. Hereinafter, the screen 6 is referred to as a "shared screen 6", because the pointers 8 corresponding to the controllers 4 are simultaneously displayed on the screen 6 and thus the screen 6 is used by the plurality of users 1. Further, the image 2 displayed on the "shared screen 6" is referred to as a "shared image 2".

Each of the controllers 4 includes arrow keys 41, a determination button 42, LR buttons 43, and a selection button 44 and supplies an operation input made by each user 1 to the PC 5. The arrow keys 41 are mainly used for moving the pointers 8 described above and the shared image 2 displayed on the shared screen 6. The determination button 42 is used for determining a command. For example, when a pointer 8 is moved onto the icon 7 using an arrow key 41 and the determination button 42 is pressed, a predetermined command is executed. The LR buttons 43 are used for enlarging and contracting the shared image 2. The selection button 44 is used for transferring the operation right to be described later.

The shape of the controller 4, positions and functions of various types of buttons, and the like may be set as appropriate. Further, instead of the controller 4, a pointing device such as a mouse, a touch panel, a keyboard, and the like may be used.

Operation of Information Processing Apparatus

The operation of the PC 5 serving as an information processing apparatus according to this embodiment will be described. The following processing by the PC 5 is realized in cooperation with software stored in the storage 58, the ROM 52, or the like, and hardware resources of the PC 5. Specifically, the CPU 51 loads a program constituting the software, which is stored in the storage 58, the ROM 52, or the like, to the RAM 53 and then executes the program, thus realizing the following processing.

First, any one of the plurality of controllers 4 connected to the PC 5 is set as a main input apparatus (hereinafter, this controller 4 is referred to as an operation controller 10). Further, the other controllers 4 other than the operation controller 10 set as a main input apparatus are set as secondary input apparatuses (hereinafter, those controllers 4 are referred to as position controllers 15).

The settings of the operation controller 10 and position controllers 15 may be made in accordance with the order of connecting the controllers 4 to the PC 5, for example, a controller 4 connected to the PC 5 earliest is set as the operation controller 10. Alternatively, for example, in the case where a plurality of jacks for connecting controllers are provided to the PC 5, a controller 4 inserted into a predetermined jack may be set as the operation controller 10. Alternatively, the operation controller 10 and the position controllers 15 may be set by inputs made by the users 1 via the respective controllers 4.

FIG. 5 is a diagram showing a look-up table (setting table) in which setting statuses of the operation controller 10 and position controllers 15 are retained. The setting table is constituted of an ID (identification) and an operation right flag of each controller. Here, the IDs of the respective controllers 4*a* to 4*d* shown in FIG. 1 are 1 to 4. Specifically, the controller 4*a* (ID=1) whose operation right flag is set is set as the operation controller 10. The setting table is stored in the storage 58 or the like of the PC 5.

Hereinafter, a pointer 8 whose movement is controlled by the operation controller 10 is described as an operation pointer 11, and pointers 8 whose movements are controlled by the position controllers 15 are described as position pointers 16.

In this embodiment, as shown in FIG. 1, the operation pointer 11 (8*a*) whose movement is controlled by the operation controller 10 (controller 4*a*) is displayed in a white arrow. Further, three position pointers 16 (8*b* to 8*d*) whose movements are controlled by the three position controllers 15 (4*b* to 4*d*) are displayed in different colors so as to be distinguishable from each other. In addition, the operation pointer 11 and the position pointers 16 are displayed so as to be different from each other in shape. Accordingly, it is possible for the users 1 to easily recognize the operation pointer 11 and the position pointers 16 of the four pointers 8. A display method by which the operation pointer 11 and the position pointers 16 can be recognized may be set as appropriate.

Figure 6:
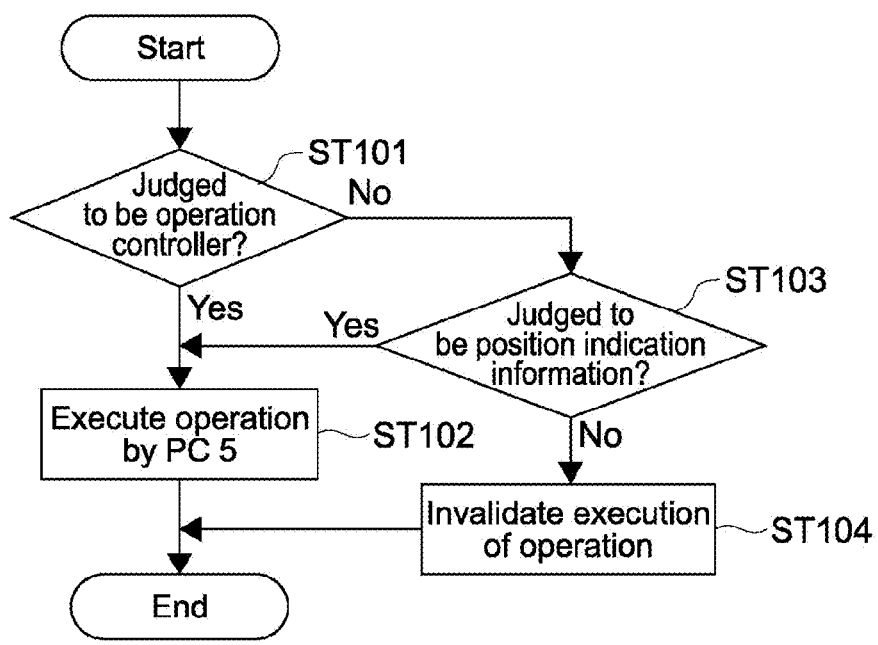
FIG. 6 is a flowchart showing an operation of the PC when operation information for executing an operation on a shared image by using a plurality of controllers is output.

Next, a description will be given on the operation of the PC 5 at a time when operation information for executing an operation on a shared image 2 is output with the plurality of controllers 4. FIG. 6 is a flowchart showing the operation.

The operation executed on the shared image 2 includes an operation of moving the display range D of the observation target 25, that is, an operation of moving the shared image 2 displayed on the shared screen 6, and an operation of enlarging or contracting the shared image 2. It should be noted that in this embodiment, an operation of controlling the movement of each pointer 8, an operation of executing a predetermined command by clicking the icon 7, or the like is executed in addition to the operation made on the shared image 2.

First, it is judged whether a controller 4 that has output operation information is the operation controller 10 or the position controller 15 (Step 101). This judgment is performed based on the setting table described above. However, the judgment as to whether the controller 4 is the operation controller 10 or the position controller 15 may be performed based on, for example, the positions of connection jacks to which the controllers 4 are connected. In such a case, the setting table described above may not be created.

In the case where the controller 4 that has output operation information is judged to be the operation controller 10 (Yes in Step 101), an operation corresponding to the output operation information is executed by the PC 5 (Step 102).

In the case where the controller 4 that has output operation information is not judged to be the operation controller 10 (No in Step 101), it is judged whether the operation information that has been output by the controller 4 is operation information corresponding to an operation of controlling the movement of a pointer 8 (hereinafter, the operation information is referred to as position indication information) (Step 103). The processing of Step 103 is performed when the operation information is output by the position controller 15.

In the case where the operation information output by the position controller 15 is judged to be position indication information (Yes in Step 103), the operation of controlling the movement of a pointer is executed by the PC 5 (Step 102).

In the case where the operation information output by the position controllers 15 is not judged to be the position indication information (No in Step 103), the PC 5 invalidates the execution of the operation corresponding to the output operation information (Step 104). The processing of "invalidating the execution of the operation" used here may be the processing in which an operation corresponding to the operation information output by the position controllers 15 is recognized by the PC 5 and the execution of the operation is invalidated by the PC 5. Alternatively, the operation information other than the position indication information, in the operation information output from the position controllers 15, may be processed as invalid information before details of the operation information are recognized by the PC 5.

As described above, in the PC 5 as an information processing apparatus according to this embodiment, one of the plurality of controllers 4 connected to the PC 5 is set as an operation controller 10, and the other controllers 4 are set as position controllers 15. Then, the execution of the processing on the shared image 2 based on the operation information from the operation controller 10 is validated, and the execution of the processing on the shared image 2 based on the operation information from the position controllers 15 is invalidated. In other words, the execution of the processing on the shared image 2 based on the operation information from the operation controller 10 is exclusively validated by the PC 5. Accordingly, it is possible to prevent a case where the plurality of users 1 do not understand to which display range D of the image the shared image 2 displayed on the shared screen 6 corresponds when, for example, simultaneously moving the shared image 2, or other cases. As a result, the plurality of users 1 can efficiently observe the observation target 25.

As described above, in this embodiment, the movement of the position pointers 16 is controlled based on the position indication information from the position controllers 15. Accordingly, each of the users 1 using the position controllers 15 can indicate a predetermined position of the shared image 2 while moving the pointer 8 on the shared screen 6.

For example, a plurality of pathologists use the information processing system 100 described above to perform a diagnosis in a conference form, a pathologist using the operation controller 10 moves, enlarges, or contracts a pathological image displayed on a shared screen. The pathologists using the position controllers 15 can pointing out predetermined positions of the pathological image while moving the position pointers 16 and state their opinions.

Next, a description will be given on the change of settings of the operation controller 10 and position controllers 15 in the plurality of controllers 4. As described above, an operation corresponding to the operation information output from the operation controller 10 is executed by the PC 5 without being invalidated. Hereinafter, the authority provided to the operation controller 10 is described as "operation right". Further, in the following description, using an example in which the operation right is transferred from the controller 4a to the controller 4b shown in FIG. 1, the change of settings of the operation controller 10 and the position controller 15 will be described.

Figure 7:
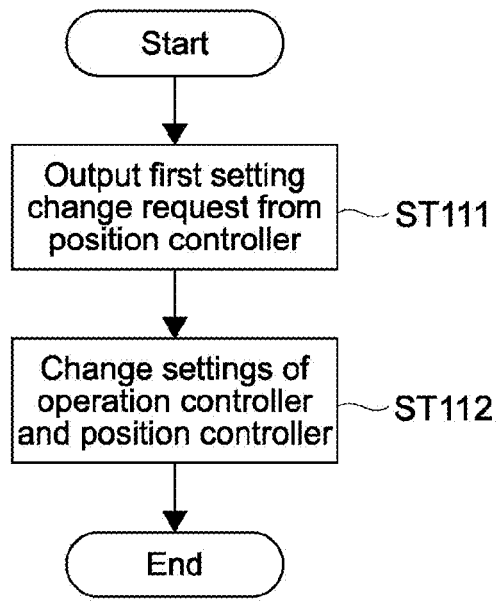
FIG. 7 is a flowchart showing an operation of the PC when an operation right is transferred among a plurality of controllers.

FIG. 7 is a flowchart showing an operation of the PC 5 when the operation right is transferred among the plurality of controllers 4.

A user 1 presses the selection button 44 of the position controller 15 (4b), and a first setting change request is output from the position controller 15 (4b) to the PC 5 (Step 111). The PC 5 that has received the first setting change request sets the position controller 15 (4b) that has output the first setting change request, as the operation controller 10. Further, the controller 4a that has been set as the operation controller 10 at a time when the first setting change request has just output is set as the position controller 15 (Step 112). Then, the operation right flags of the setting table shown in FIG. 5 are changed. Accordingly, the operation right is transferred from the controller 4a to the controller 4b.

Figure 8:
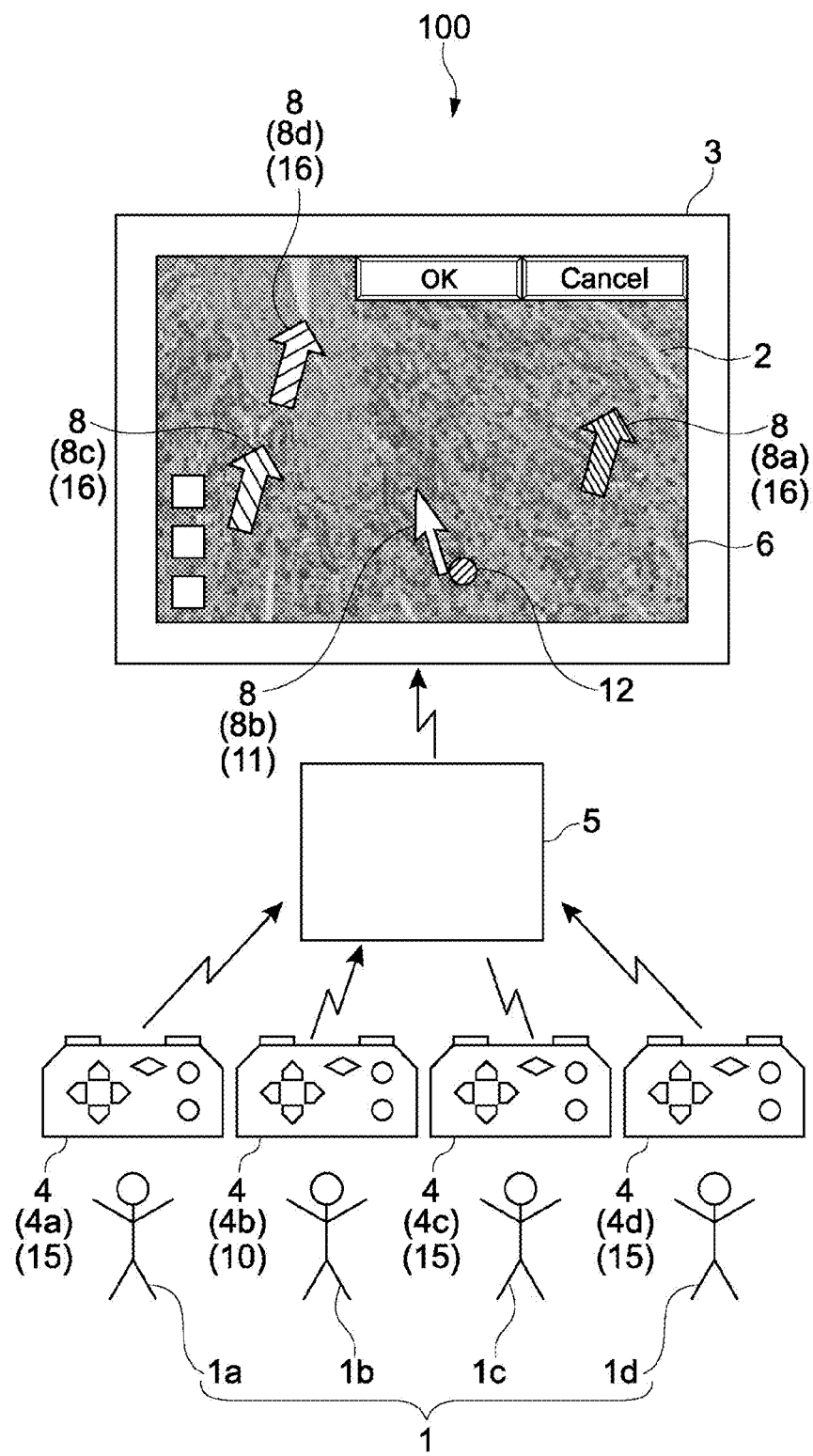
FIG. 8 is a diagram showing a shared screen at a time when the operation right is transferred from one controller to another controller.

FIG. 8 is a diagram showing a shared screen 6 at a time when the operation right is transferred from the controller 4a to the controller 4b. As compared to FIG. 1, the pointer 8b corresponding to the controller 4b set as the operation controller 10 is displayed as the operation pointer 11. Further, the pointer 8a corresponding to the controller 4a deprived of the operation right and set as the position controller 15 is displayed as the position pointer 16.

As shown in FIG. 8, the operation pointer 11 is provided with a setting change mark 12. The setting change mark 12 indicates information of the three pointers 8b to 8d that has been displayed in a distinguishable manner. For example, in the case where the pointer 8b (position pointer 16) shown in FIG. 1 has been displayed in a blue arrow, when the pointer 8b is changed to be the operation pointer 11, the pointer 8b is provided with a mark having a blue circular shape as the setting change mark 12. Accordingly, the plurality of users 1 can intuitively grasp which position pointer 16 is changed to the operation pointer 11, that is, to whose controller 4 among the users 1 the operation right is transferred.

In this manner, in the PC 5, the first setting change request is output from the position controllers 15, with the result that the settings of the operation controller 10 and the position controller 15 in the plurality of controllers 4 can be changed. Accordingly, the observation target 25 can efficiently be observed by the plurality of users 1. For example, a pathologist who uses a position controller 15 presses the selection button 44 to transfer the operation right to his/her controller 4 when stating his/her opinion. Accordingly, users can present the details of their opinions while moving a shared image 2. As a result, the efficiency or accuracy of a diagnosis or the like performed by a plurality of pathologists is improved, and an erroneous diagnosis or the like can be reliably prevented from occurring.

Second Embodiment

A description will be given on a PC serving as an information processing apparatus according to a second embodiment. In the following description, equivalents to various types of apparatuses used in the information processing system 100 described in the first embodiment, processing thereof, and the like are not described or simply described.

Figure 9:
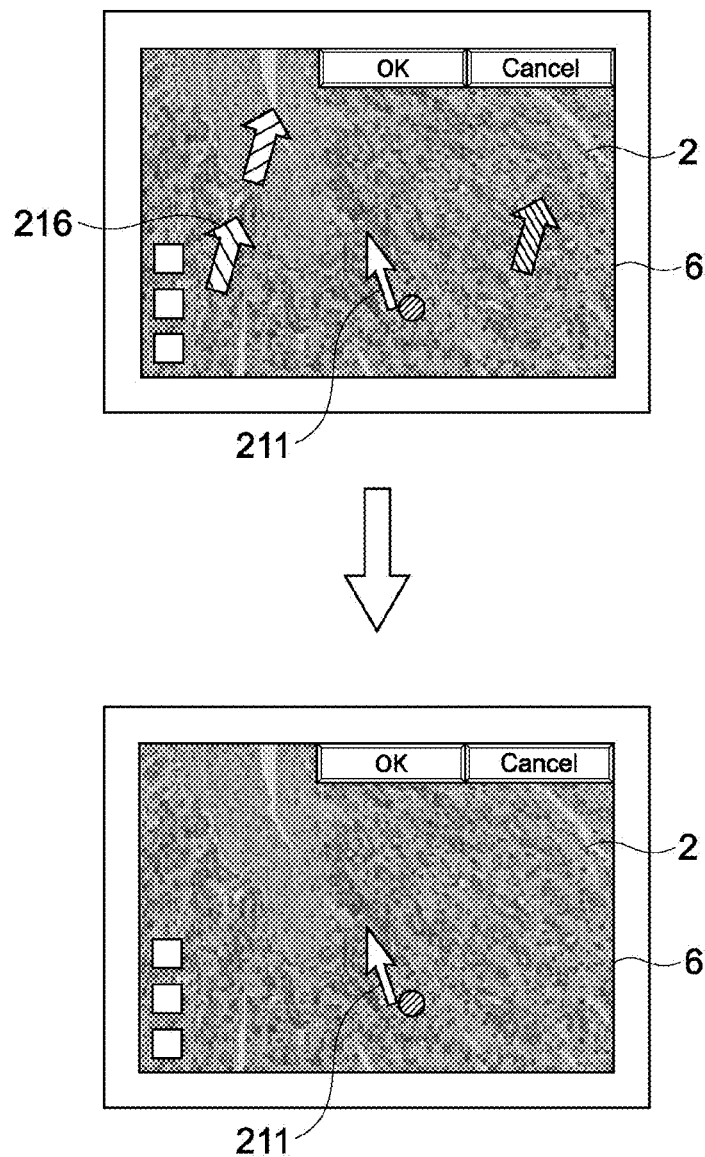
FIG. 9 is a diagram for explaining the display of an operation pointer and a position pointer by a PC according to a second embodiment.

FIG. 9 is a diagram for explaining the display of an operation pointer 211 and a position pointer 216 by a PC according to this embodiment. As shown in FIG. 9, in this embodiment, the position pointer 216 that corresponds to a position controller that a user does not operate for a certain period of time is deleted from the shared screen 6. Therefore, the position pointer 216 that is not operated hardly interferes with viewing at a time when the shared image 2 on the shared screen 6 is observed by the plurality of users. It should be noted that though three position pointers 216 are all deleted in FIG. 9, the following processing is performed for each of the position pointers 216.

Figure 10:
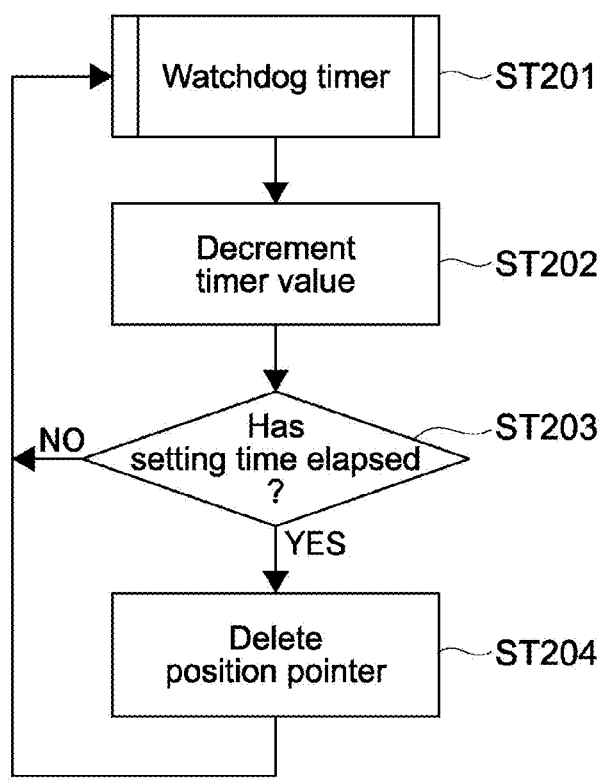
FIG. 10 is a flowchart showing an example of the processing of the PC in the case where the position pointer is deleted from the shared screen shown in FIG. 9.

FIG. 10 is a flowchart showing an example of the processing in which the position pointer 216 is deleted by the PC. The PC according to this embodiment has a function of a watchdog timer that increments a counter periodically and outputs time-up information when the counter exceeds a certain value (Step 201). Before the time-up information is output, the CPU clears the counter of the watchdog timer periodically.

Each time the watchdog timer increments the counter, a timer value set in advance is decremented (Step 202). With this timer value, a time length during which the position pointer 216 is not operated, which becomes a condition for deleting the position pointer 216, is set. The timer value may be determined based on the length of an interval between counts of the watchdog timer.

In the state where the position pointer 216 is not operated, it is judged whether a period of time set as a condition for deleting the position pointer 216 has elapsed (Step 203). In the case where the timer value is 0 as a result of the timer value being decremented in Step 202, it is judged that the setting time has elapsed. In the case where the timer value is not 0, it is judged that the setting time has not yet elapsed.

When it is judged that the setting time has not yet elapsed (No in Step 203), the CPU clears the counter of the watchdog timer, and the similar processing is performed again based on the count of the watchdog timer. When it is judged that the setting time has elapsed (Yes in Step 203), the position pointer 216 is deleted from the shared screen 6 and the counter of the watchdog timer is cleared (Step 204).

Figure 11:
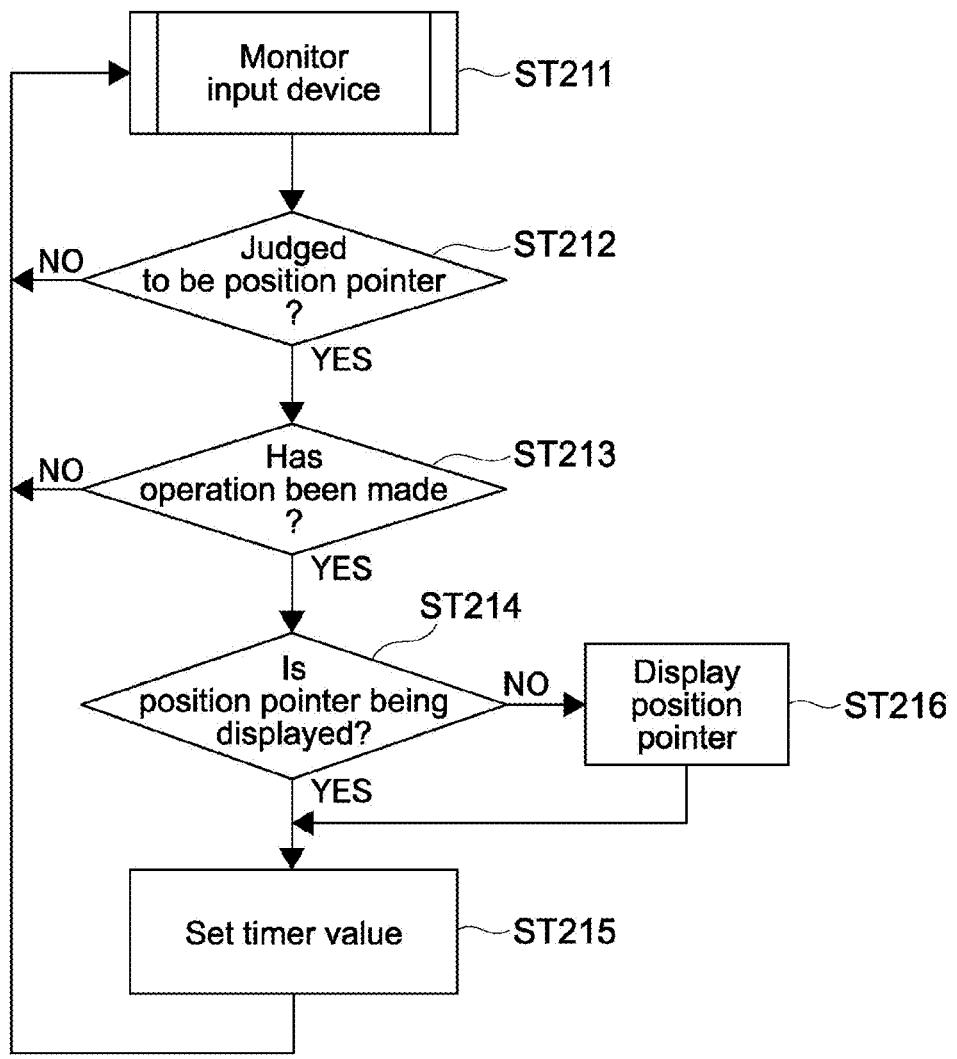
FIG. 11 is a flowchart showing an example of the processing of the PC in the case where the deleted position pointer is displayed again on the shared screen.

FIG. 11 is a flowchart showing an example of the processing of the PC in the case where the deleted position pointer 216 is displayed again on the shared screen 6. As shown in Step 211, the PC monitors the controllers as input devices according to this embodiment. The PC may monitor the controllers by using the step performed for other processing.

It is judged whether a pointer operated by a controller to be monitored is the position pointer 216 (Step 212). When it is judged that a pointer operated by a controller to be monitored is not the position pointer 216 (No in Step 212), the processing of deleting a pointer is not performed. The operation pointer 211 that is not the position pointer 216 is controlled by the operation controller having the operation right, and the operation pointer 211 is controlled so that various operations for the shared image 2 are executed by the PC. Accordingly, the operation pointer 211 may not be deleted.

In the case where it is judged that a pointer operated by the controller to be monitored is the position pointer 216 (Yes in Step 212), it is judged whether that position pointer 216 is operated via the position controller (Step 213). In the case where it is judged that the position pointer 216 is not operated (No in Step 213), the PC returns to the monitoring of the controllers in Step 211.

In the case where it is judged that the position pointer 216 is operated (Yes in Step 213), it is judged whether the position pointer 216 is currently being displayed on the shared screen 6 (Step 214). In the case where it is judged that the position pointer 216 is being displayed on the shared screen 6 (Yes in Step 214), the timer value described in Step 202 shown in FIG. 10 is set (Step 215). In the case where the position pointer 216 is not being displayed on the shared screen 6 (No in Step 214), a position pointer 216 is displayed on the shared screen 6 (Step 216), and a timer value is set.

In the case where the position pointer 216 is displayed again in Step 216, it may be possible to store the position of the position pointer 216 previously deleted on the shared screen 6 and display the position pointer 216 from that position again. Alternatively, the position pointer 216 may be displayed again from a predetermined position such as the center of the shared screen 6, or may be displayed from the same position as that of the operation pointer 211 currently being displayed. In the case where a period of time during which the position pointer 216 is not displayed is long, since the user forgets where the position pointer 216 has been, it is effective to redisplay the position pointer 216 from the position of the operation pointer 211 currently being displayed.

Third Embodiment

Figures 12, 13:
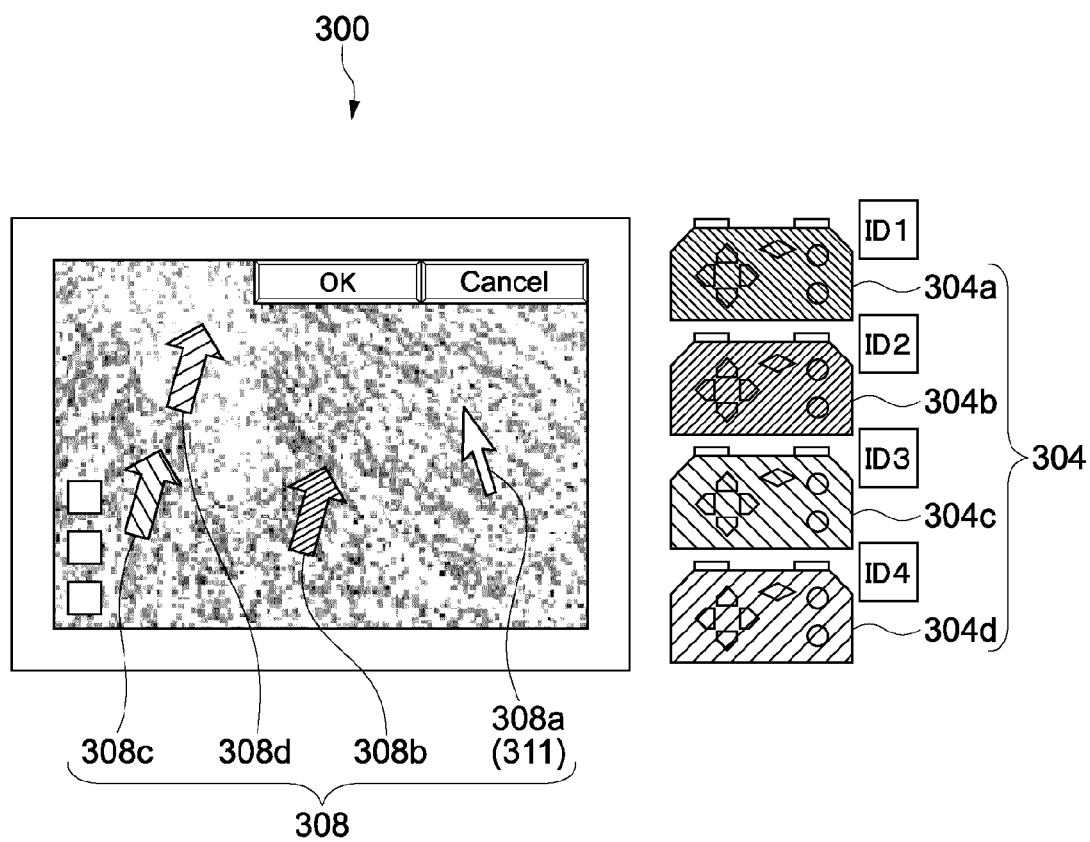
FIG. 12 is a diagram for explaining an information processing system according to a third embodiment.
FIG. 13 is a diagram showing an example of a setting table used for setting colors of a plurality of pointers shown in FIG. 12.

FIG. 12 is a diagram for explaining an information processing system according to a third embodiment. In an information processing system 300 of this embodiment, the settings are made such that the colors of the controllers 304 (304a to 304d) are the same as those of pointers 308 (308a to 308d) corresponding to the controllers 304. Accordingly, it is possible to easily recognize which pointer 308 is operated by each user, and efficiently observe an observation target. It should be noted that an operation pointer 311 whose movement is controlled by an operation controller having the operation right is displayed in a white arrow.

FIG. 13 is a diagram showing an example of a setting table used for setting colors of the respective pointers 308a to 308d. In this manner, by preparing in advance a setting table in which IDs of the respective controllers 304 are associated with the colors of the respective controllers 304, it is possible to associate the colors of the controllers 304 with those of the respective pointers 308.

The method of associating the controllers 304 with the pointers 308 is not limited to the coloration described above. For example, the controllers 304 (users using those controllers 304) and the pointers 308 may be associated with each other by putting an image like a text indicating a user's name, a mark representing each user, or the like on each of the pointers 308.

Fourth Embodiment

Figure 14:
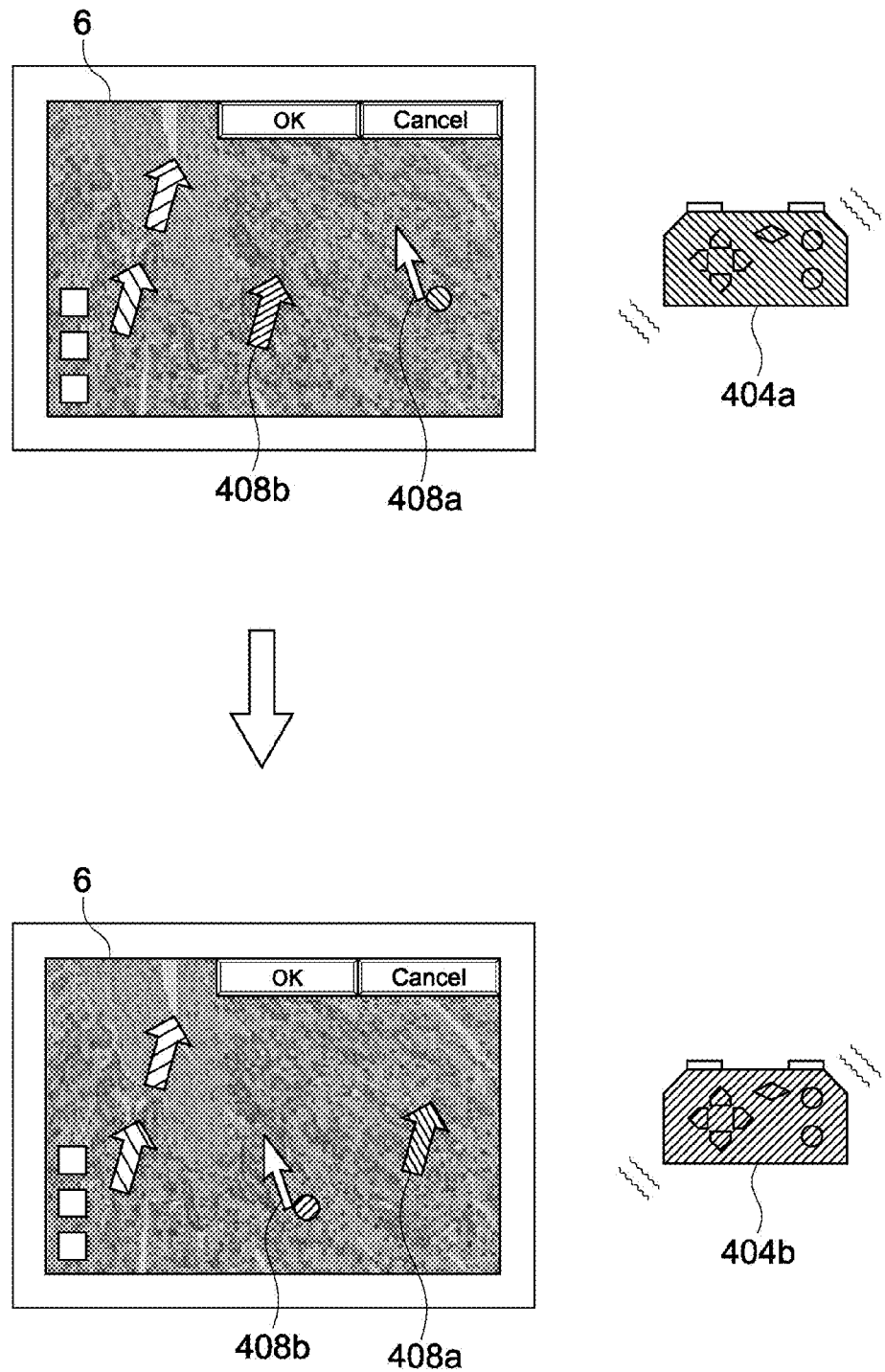
FIG. 14 is a diagram for explaining the transfer of an operation right according to a fourth embodiment.

FIG. 14 is a diagram for explaining the transfer of an operation right according to a fourth embodiment. FIG. 14 shows a shared screen 6 at a time when the operation right is transferred from a controller 404a (green controller) to a controller 404b (blue controller), and the display of pointers 408a and 408b corresponding to the controllers 404a and 404b is changed.

The controllers of this embodiment each have a vibration function and the PC can vibrate the controllers by outputting a predetermined control signal. As shown in FIG. 14, when the operation right is transferred from the green controller 404a to the blue controller 404b, the blue controller 404b that has acquired the operation right and the green controller 404a that has been deprived of the operation right vibrate. In this manner, two users who use the controllers 404a and 404b may be notified of the fact that the operation right has been transferred. Accordingly, users can recognize the transfer of the operation right more precisely.

The notification for the blue controller 404b that has acquired the operation right and the notification for the green controller 404a that has been deprived of the operation right may be different from each other. For example, there is conceived a method of strongly vibrating the blue controller 404b that has acquired the operation right and vibrating the green controller 404a that has been deprived of the operation right more weakly than the blue controller 404b. In addition, a cycle of vibration, a period of time for which vibration is continued, or the like may be different from the green controller 404a and the blue controller 404b. In this manner, by setting vibration control for the controllers 404a and 404b as appropriate, it may be possible to notify a plurality of users of the transfer of the operation right by only vibration.

Fifth Embodiment

Figure 15:
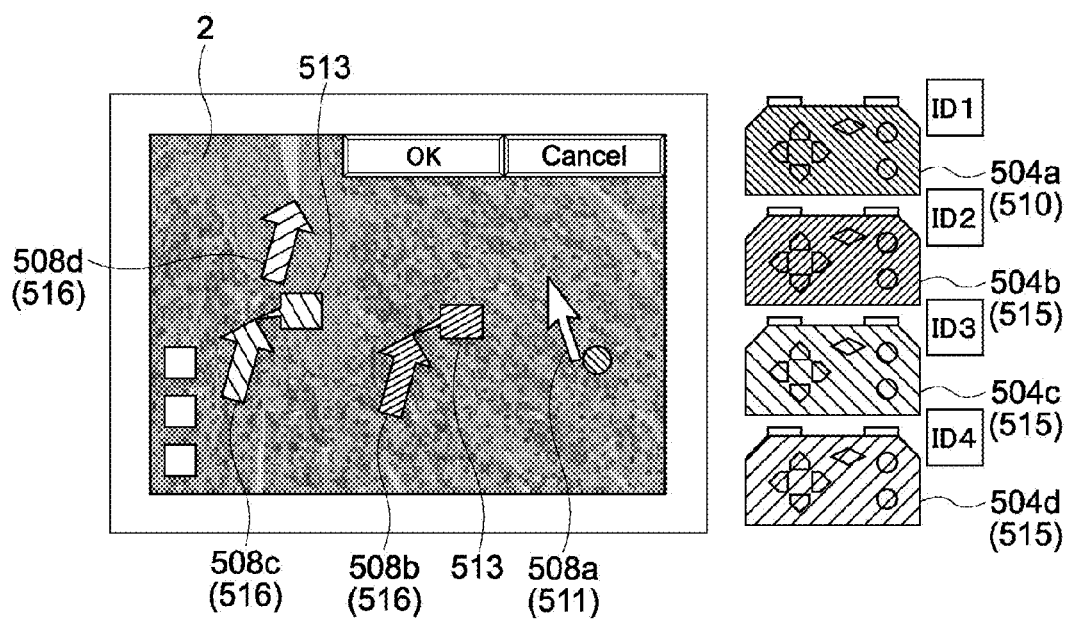
FIG. 15 is a diagram showing pointers displayed on a shared screen according to a fifth embodiment.

FIG. 15 is a diagram showing pointers displayed on a shared screen according to a fifth embodiment. As shown in FIG. 15, in this embodiment, a user can set an annotation 513 at a predetermined position of a shared image 2 by using a position controller 515. The annotation 513 is a note obtained by visually combining position information and detail information. The position information is set by a user at a point of the shared image 2 to be focused, for example, a part having the possibility of a disease. The detail information is associated with the position information.

In other words, the PC according to this embodiment executes an operation of controlling the movement of a pointer based on the position indication information from the position controller 515, and an operation of annotation setting processing that is based on the annotation information from the position controller 515.

In this manner, since the user using the position controller 515 can set an annotation for the shared image 2, an observation target can be efficiently observed by a plurality of users.

Sixth Embodiment

Figure 16:
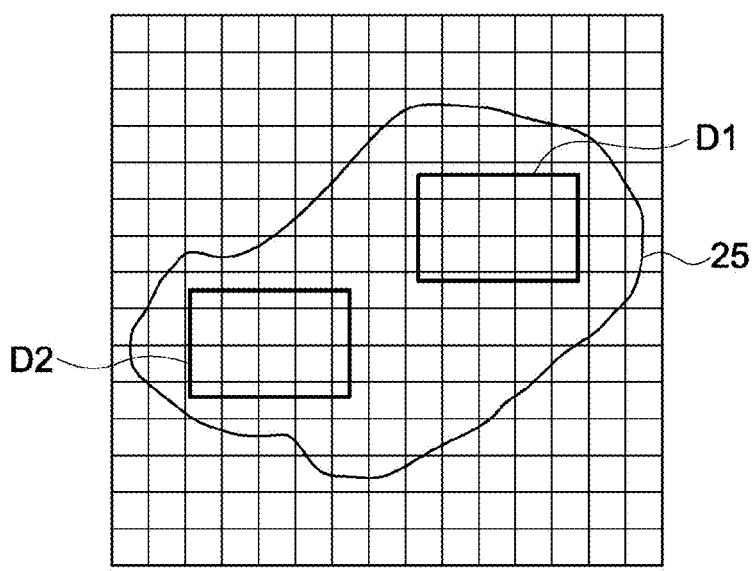
FIG. 16 is a diagram for explaining an operation of an information processing apparatus (PC) according to a sixth embodiment.
Figure 17A:
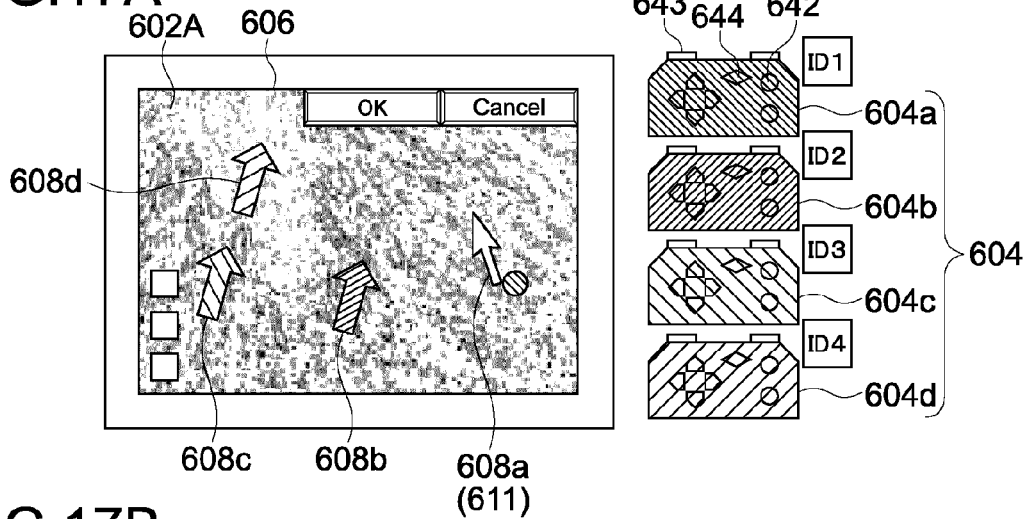
FIG. 17 are diagrams for explaining an operation of the information processing apparatus (PC) according to the sixth embodiment.

FIGS. 16 and 17 are diagrams for explaining an operation of an information processing apparatus (PC) according to a sixth embodiment. As shown in FIG. 16, it is assumed that in an image having an arbitrary resolution of the image pyramid structure 20 described with reference to FIG. 4, a display range D1 is displayed as a shared image 602A on a shared screen 606. In this case, a controller 604a has an operation right and as shown in FIG. 17A, an operation pointer 611 corresponding to the controller 604a is displayed in a white arrow.

Figure 17B:
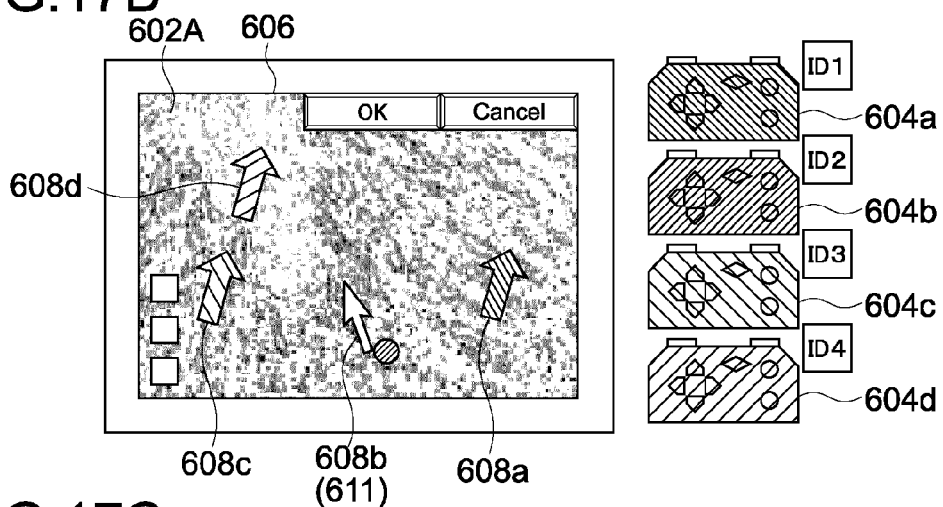
Figure 17C:
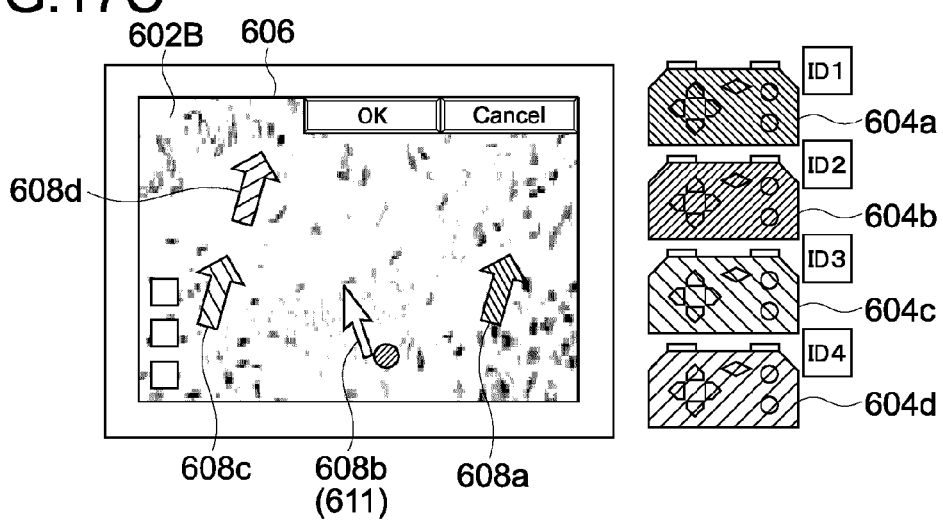

Here, it is assumed that when the shared image 602A of the display range D1 is displayed, a first setting change request is output from a controller 604b set as a position controller. Then, the operation right is transferred from the controller 604a to the controller 604b, and a pointer 608b corresponding to the controller 604b is displayed as an operation pointer 611 as shown in FIG. 17B.

A user who uses the controller 604b that has acquired the operation right and has been set as an operation controller can move the shared image 602A. In other words, a display range D2 shown in FIG. 16 can be displayed as a shared image 602B on the shared screen 606.

Here, assuming that when the shared image 602B of the display range D2 is displayed, a second setting change request is output from the controller 604a that has been deprived of the operation right just now, the PC transfers the operation right again from the controller 604b to the controller 604a. Further, the PC displays, on the shared screen 606, the shared image 602A of the display range D1 being displayed when the operation right has been transferred earlier. In other words, the shared image 602A shown in FIG. 17A is displayed by the PC on the shared screen 606.

As described above, in the PC according to this embodiment, a controller that has been deprived of the operation right previously and whose setting has been changed from an operation controller to a position controller is set as an operation controller again. At this time, a shared image that has been operated previously by that controller as an operation controller is stored as history information.

FIG. 18 is a diagram showing a setting table used for the processing described above. The setting table shown in FIG. 18 includes IDs, operation right flags, and position information items of the respective controllers, the position information items referring to information items of a shared image displayed when an operation right has been taken previously. The position information of a shared image used here refers to position information of the display range D shown in FIG. 16, with which coordinates (x,y) of the center position of the display range D are managed, for example. In addition, to store the history information of a shared image displayed when the operation right has been taken, information of a magnification or time may be used. For example, it is assumed that the operation right is transferred from the controller 604a to the controller 604b and the magnification of the shared image 602A is changed. In such a case, by managing the information of the magnification, it is possible to redisplay the shared image 602A at the magnification that has been previously used, when the operation right is transferred again to the controller 604a.

In this embodiment, the second setting change request output from each controller 604 is output by, for example, double-clicking a selection button 644 or pressing the selection button 644 while pressing a determination button 642 or an LR button 643. In other words, a controller may be operated by an operation method that is different from a method used when the first setting change request is output. Accordingly, both the processing of only transferring the operation right based on the first setting change request, without changing the shared image 602 (processing from FIG. 17A to FIG. 17B), and the processing of transferring the operation right and also changing the shared image 602 based on the second setting change request (processing from FIG. 17C to FIG. 17A) can be performed.

In the case where the shared image 602 is changed along with the transfer of the operation right, the position at which each pointer 608 is displayed may be set as a default. Alternatively, it may be possible to store position information of each pointer 608 and then display each pointer 608 based on the stored position information.

For example, in the case where a similar disease is found in the display ranges D1 and D2 shown in FIG. 16, there may be a case where a discussion is made on the shared images 602A and 602B focused by the users. In this case, by switching between the shared images 602A and 602B along with the transfer of the operation right, it is possible to efficiently carry the discussion on the two shared images 602A and 602B. It should be noted that since the positions of the display ranges D1 and D2 are recognized by the users, it becomes hardly difficult to grasp the shared image 602 by switching between the shared images 602A and 602B.

Seventh Embodiment

Figure 19:
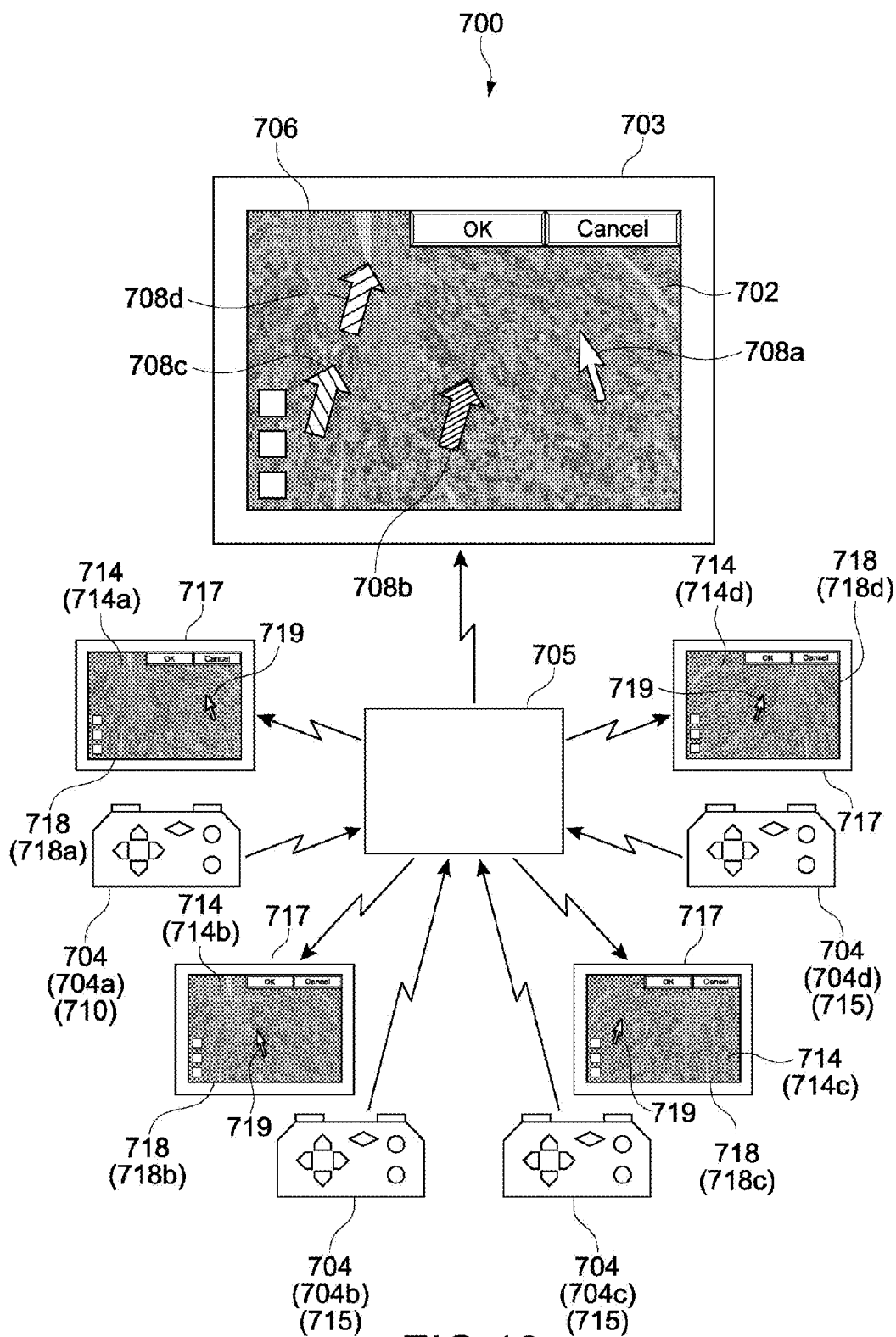
FIG. 19 is a schematic diagram showing a structure of an information processing system according to a seventh embodiment.

FIG. 19 is a schematic diagram showing a structure of an information processing system according to a seventh embodiment. An information processing system 700 of this embodiment includes a plurality of display apparatuses 717 to display images 714 that are individually viewed by respective users (hereinafter, referred to as individual image 714). The plurality of display apparatuses 717 are connected to a PC 705 serving as an information processing apparatus according to this embodiment by a wired manner or wirelessly, and are provided correspondingly to controllers 704 that are used by respective users. Further, the plurality of display apparatuses 717 each have an individual screen 718, and the individual image 714 is displayed on the individual screen 718.

In the information processing system 700 according to this embodiment, a display apparatus 703 including a shared screen 706, and the plurality of display apparatuses 717 each having the individual screen 718 may be integrally provided as a display unit or may be provided individually.

In this embodiment, first operation information and second operation information are output from the controllers 704. The first operation information is used for executing an operation on a shared image 702, and the second operation information is used for executing an operation on the individual image 714. For example, each user operates the controller 704, thus switching between a mode to operate the shared image 702 and a mode to operate the individual image 714. Accordingly, the first operation information and the second operation information that are output to the PC 705 are distinguished from each other. The operation method for the controllers for operating the shared image 702 and the individual image 714 may be the same.

The PC 705 performs the processing described in each embodiment on the first operation information output from each controller 704. In other words, regarding the first operation information output from the controller 704 set as a position controller, the execution of the processing on the shared image 702 is invalidated.

On the other hand, regarding the second operation information output from each controller 704, the execution of the processing on the individual image 714 is validated. In other words, each user can move, enlarge, or contract the individual image 714 without restraint, irrespective of whether the controller 704 used by each user is an operation controller or a position controller. As shown in FIG. 19, an individual pointer 719 that can be used by a user is displayed on each individual screen 718. The individual pointer 719 is controlled by the controller 704 used by the user, with the result that various operations are executed on the individual image 714.

Thus, each user can also observe well the individual image 714 of an observation target displayed on the individual screen 718 during the use of the controller 704 set as the position controller. Therefore, it is possible for a user to organize well his/her opinion or the like while operating the individual image 714, during a period of time in which another user with an operation controller is operating the shared image 702.

Next, a description will be given on a case where the operation right is transferred in the information processing system 700 according to this embodiment.

In this embodiment, position information, magnification information, time-of-day information, or the like of the individual image 714 displayed on each individual screen 718 is stored in a storage or the like of the PC 705. When a setting change request is output from a position controller 715 (704b) shown in FIG. 19, the operation right is transferred from an operation controller 710 (704a) to the controller 704b. At this time, based on the information items stored in the storage of the PC 705, an individual image 714b displayed on an individual screen 718b provided correspondingly to the controller 704b is displayed as the shared image 702 on the shared screen 706. Accordingly, when the operation right is transferred to the controller 704 each user uses, the user can state his/her opinion while showing the individual image 714 operated by his/herself to another user, as the shared image 702.

It should be noted that by the PC 705, only the transfer of the operation right may be executed without changing the shared image 702 as described in the first embodiment. Alternatively, as described in the sixth embodiment, a shared image displayed when the operation right has been previously taken may be redisplayed on the shared screen along with the transfer of the operation right.

Other Embodiments

Embodiments according to the present application are not limited to the embodiments described above, and various embodiments may be possible.

Figure 20:
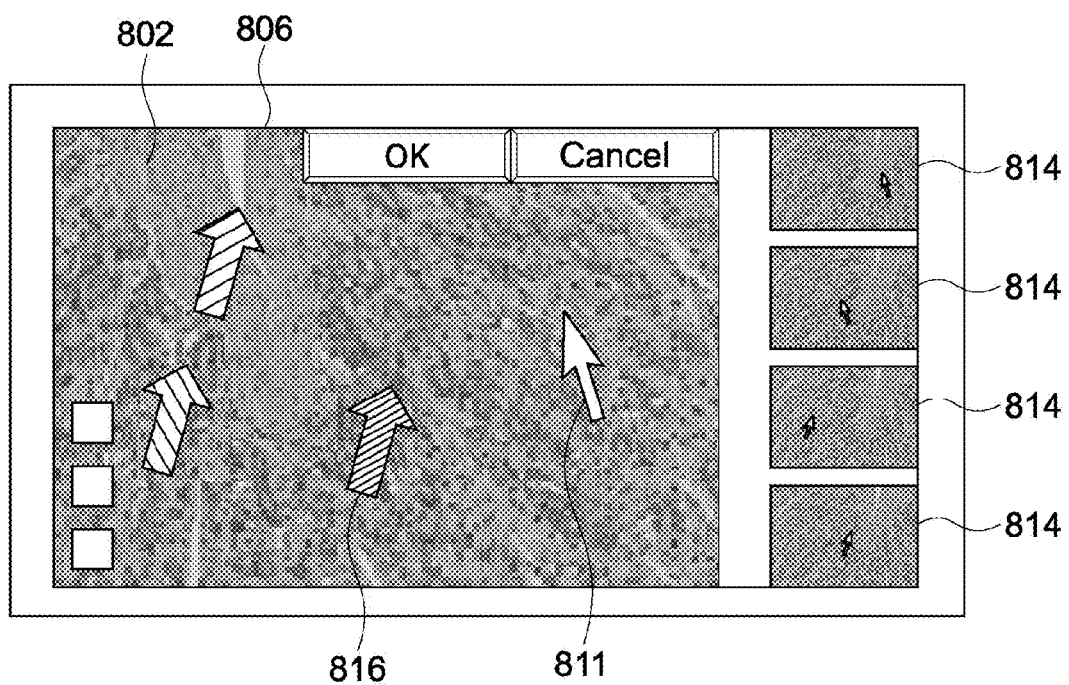
FIG. 20 is a diagram for explaining a modified example of the seventh embodiment.
Figure 21:
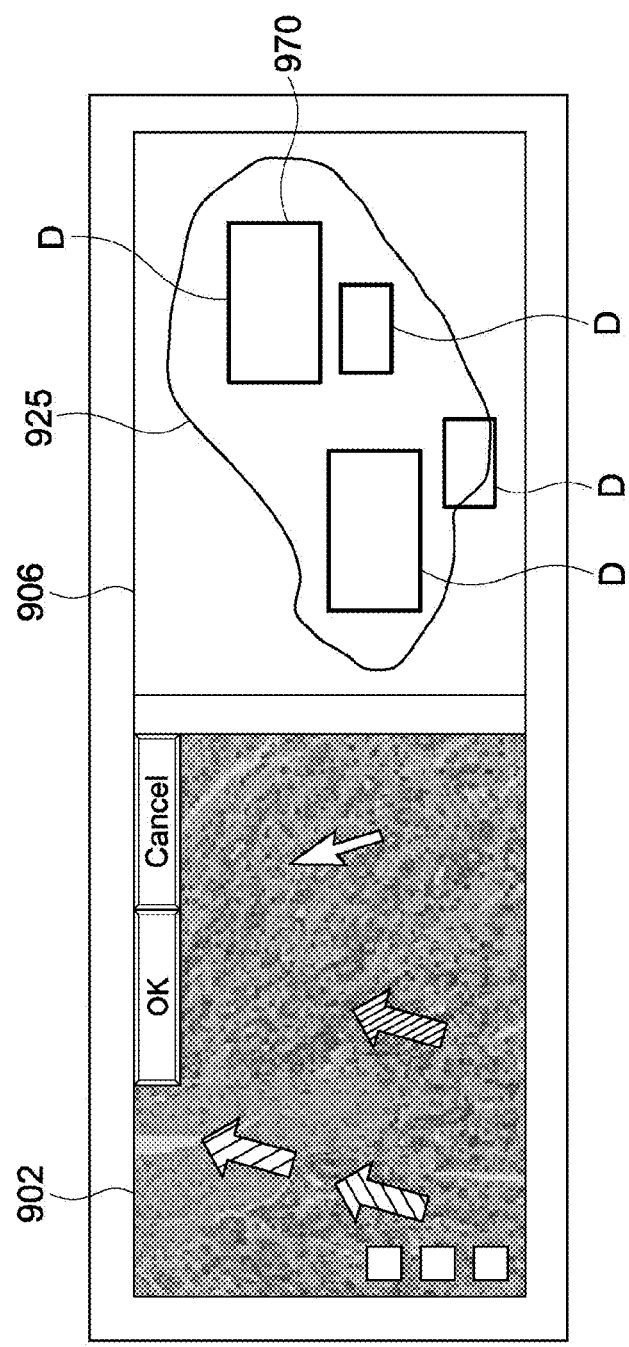
FIG. 21 is a diagram for explaining the modified example of the seventh embodiment.

FIGS. 20 and 21 are diagrams for explaining a modified example of the seventh embodiment. As shown in FIG. 20, a shared image 802 and a plurality of individual images 814 operated by users may be displayed together on a shared screen 806. Accordingly, the individual images 814 observed by the respective users can be recognized by other users.

For example, an operation pointer 811 is moved onto an individual image 814 with an operation controller having the operation right, and a determination button of the operation controller is pressed. The individual image 814 thus selected may be displayed as the shared image 802. Alternatively, instead of the operation pointer 811, an individual image 814 may be selected using a position pointer 816.

As shown in FIG. 21, instead of the individual images observed by the respective user, display ranges D corresponding to the respective individual images may be displayed on a shared screen 906. Accordingly, positions of an observation target 925 at which the respective users are observing or the magnification of the observation can be intuitively grasped. It should be noted that in this modified example, the magnification of the individual image each user observes is expressed by changing the size of the display range D. As the display range D shown in FIG. 21 is made smaller, the magnification of an individual image corresponding to the display range D is made larger.

A frame 970 representing each display range D or the inside of the display range D is selected, an individual image corresponding to the display range D is displayed as a shared image 902. By displaying the frames 970 in different colors, it may be possible to identify to which user's individual image each display range D corresponds. Alternatively, the types of line of the frames 970 (difference in line width, difference in type such as solid line and a broken line, or the like) may be different. It should be noted that the display range D is not limited to a rectangle.

In the embodiments described above, the execution of an operation on a shared image that corresponds to operation information from a position controller is invalidated. However, if it is not difficult to recognize a shared image displayed on a shared screen, it may be possible to make a setting such that the execution of a part of operation on a shared image is validated. For example, there is conceived a setting in which a shared image is not moved, but the shared image can be enlarged or contracted by using a position controller.

In the information processing system described above, there has been described the case where the controllers and the display apparatus are connected to the I/O interface 55 of the PC 5 described with reference to FIG. 2. However, as an information processing apparatus according to an embodiment, a PC or the like integrally provided with each controller and a shared screen may be used. In this case, the controller may be provided as an input unit connected to the I/O interface 55, and the shared screen may be provided as a display connected to the I/O interface 55.

The PC is used as an information processing apparatus according to one embodiment described above, but may be a dedicated information processing apparatus without being limited to the PC. Further, the information processing apparatus is not limited to an apparatus that realizes the information processing described above in cooperation with hardware and software resources, and the information processing described above may be realized by dedicated hardware.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus, comprising:
a connection unit configured to be capable of connecting a plurality of input apparatuses that output operation information for executing an operation for an image displayed on a screen;
a processing execution unit configured to be capable of executing processing corresponding to the operation information on the image displayed on the screen;
a setting unit configured to set one of the plurality of input apparatuses connected by the connection unit, as a main input apparatus, and set the other input apparatuses as secondary input apparatuses; and
a controller configured to:
   determine whether the operation information is received from the main input apparatus or the secondary input apparatuses,
   determine whether the operation information includes position indication information,
   responsive to determining that the operation information is received from the main input apparatus, perform control such that execution of the processing for the image by the processing execution unit based on the operation information from the input apparatus set as the main input apparatus is validated,
   responsive to determining that the operation information is received from the secondary input apparatuses and the operation information includes position indication information, perform control such that execution of the processing for pointers related to the image by the processing execution unit based on the position indication information from the input apparatuses set as the secondary input apparatuses is validated, and
   responsive to determining that the operation information is received from the secondary input apparatuses and the operation information does not include position indication information, perform control such that execution of the processing for the image by the processing execution unit based on the operation information from the input apparatuses set as the secondary input apparatuses is discarded.

2. The information processing apparatus according to claim 1, further comprising a pointer display means for displaying the pointers that indicate positions designated by the plurality of input apparatuses on the screen such that correspondences between the pointers and the plurality of input apparatuses can be distinguished from one another.

3. The information processing apparatus according to claim 2, wherein the controller is configured to validate the position indication information regardless of input apparatus designation so that the pointer display means moves the corresponding pointer on the screen based on the position indication information.

4. The information processing apparatus according to claim 1, wherein based on a setting change request that is input from one of the input apparatuses set as the secondary input apparatuses, the setting unit changes a setting such that the input apparatus is set as the main input apparatus.

5. The information processing apparatus according to claim 4,
wherein the operation for the image is an operation of changing a display position of image data on the screen, the image data having a larger resolution as that of the screen,
the information processing apparatus further comprising a storage configured to store information of the display position of the image data, wherein when a setting of one of the plurality of input apparatuses is changed from the main input apparatus to the secondary input apparatus by the setting unit, the controller stores, in the storage, the information of the display position of the image data that has been displayed on the screen before a setting change, and when the input apparatus is then set as the main input apparatus, the controller restores display of the image data before the setting change based on the information of the display position of the image data stored in the storage.

6. The information processing apparatus according to claim 5, wherein the image data having the larger resolution includes image data of the image.

7. The information processing apparatus according to claim 1, wherein discarding the operation information includes invalidating the operating information such that the processing execution unit operates as though the operating information was not provided by the secondary input apparatuses.

8. An information processing method, comprising:
   setting, by a setting unit, as a main input apparatus, one of a plurality of input apparatuses connected to a connection unit to output operation information for executing an operation for an image displayed on a screen, and setting the other input apparatuses as secondary input apparatuses;
   determining, by a controller, whether the operation information is received from the main input apparatus or the secondary input apparatuses;
   determining, by the controller, whether the operation information includes position indication information,
   responsive to determining that the operation information is received from the main input apparatus, exclusively validating, by the controller, execution of processing for the image based on the operation information from the input apparatus set as the main input apparatus;
   responsive to determining that the operation information is received from the secondary input apparatuses and the operation information does not include the position indication information, exclusively invalidating, by the controller, execution of processing for the image based on the operation information from the secondary input apparatuses;
   responsive to determining that the operation information is received from the secondary input apparatuses and the operation information includes the position indication information, exclusively validating, by the controller, execution of processing pointers related to the image based on the position indication information from the secondary input apparatuses; and
   executing, by a processing execution unit, the processing for the image based on the operation information.

9. A non-transitory machine-accessible device having program instructions stored thereon that are configured, when executed, to cause a computer to operate as:
   a connection unit configured to be capable of connecting a plurality of input apparatuses that output operation information for executing an operation for an image displayed on a screen;
   a processing execution unit configured to be capable of executing processing corresponding to the operation information on the image displayed on the screen;
   a setting unit configured to set one of the plurality of input apparatuses connected by the connection unit, as a main input apparatus, and set the other input apparatuses as secondary input apparatuses; and
   a controller configured to:
      determine whether the operation information is received from the main input apparatus or the secondary input apparatuses,
      determine whether the operation information includes position indication information,
      responsive to determining that the operation information is received from the main input apparatus, perform control such that execution of the processing for the image by the processing execution unit based on the operation information from the input apparatus set as the main input apparatus is exclusively validated,
      responsive to determining that the operation information is received from the secondary input apparatuses and the operation information includes the position indication information, perform control such that the position indication information from the secondary input apparatuses is validated, and
      responsive to determining that the operation information is received from the secondary input apparatuses and the operation information does not include the position indication information, perform control such that the operation information from the secondary input apparatuses is ignored.

10. An information processing system, comprising:
   a plurality of input apparatuses that output operation information for executing an operation for an image displayed on a screen;
   a setting unit configured to set one of the plurality of input apparatuses as a main input apparatus, and set the other input apparatuses as secondary input apparatuses;
   a display configured to display, as the screen, a shared screen and an individual screen, the shared screen displaying an image as an operation target for a user using the input apparatus set as the main input apparatus and a plurality of pointers indicating positions designated by the plurality of input apparatuses, the individual screen of each input apparatus displaying an image as an operation target for a user using one of the input apparatuses set as the secondary input apparatuses and a pointer designated by the input apparatus;
   a processing execution unit configured to be capable of executing processing corresponding to the operation information on each of the images displayed on the shared screen and the individual screen; and
   a controller configured to:
      determine whether the operation information is received from the main input apparatus or the secondary input apparatuses,
      determine whether the operation information includes position indication information,
      responsive to determining that the operation information is received from the main input apparatus, perform control such that execution of the processing for the image displayed on the shared screen by the processing execution unit based on the operation information from the input apparatus set as the main input apparatus is exclusively validated, and
      responsive to determining that the operation information is received from the secondary input apparatuses and the operation information does not include the position indication information, perform control such that the operation information from the secondary input apparatuses is discarded, and
      responsive to determining that the operation information is received from the secondary input apparatuses and the operation information includes the position indication information, perform control such that the position indication information from the secondary input apparatuses is validated.

11. The information processing system according to claim 10, wherein based on a setting change request that is input from one of the input apparatuses set as the secondary input apparatuses, the setting unit changes a setting such that the input apparatus is set as the main input apparatus.

12. The information processing system according to claim 11, wherein when a setting of the input apparatus is changed from the secondary input apparatus to the main input apparatus by the setting unit based on the setting change request from the input apparatus, the controller displays the image that has been displayed on the individual screen before a setting change, as an image of the shared screen.

* * * * *